United States Patent [19]

Buckshaw et al.

[11] Patent Number: 4,800,633

[45] Date of Patent: Jan. 31, 1989

[54] METHOD OF MAKING A WATER LEVEL CONTROL DEVICE

[75] Inventors: Thomas M. Buckshaw, Indiana; David T. Llewellyn, Strongstown, both of Pa.

[73] Assignee: Robertshaw Controls Company, Richmond, Va.

[21] Appl. No.: 71,148

[22] Filed: Jul. 8, 1987

Related U.S. Application Data

[62] Division of Ser. No. 857,636, Apr. 29, 1986, Pat. No. 4,696,204.

[51] Int. Cl.[4] .............................................. F16H 53/00

[52] U.S. Cl. ...................................... 29/157 R; 74/567

[58] Field of Search .................... 29/157 R; 200/81 R, 200/83 R, 83 SS, 83 B, 61.2, 153 L, 153 LA; 337/318, 319, 361; 74/567, 107; 403/407.1

[56] References Cited

U.S. PATENT DOCUMENTS

| | | | |
|---|---|---|---|
| 2,641,661 | 6/1953 | Puerner et al. | 200/153 LA |
| 3,249,712 | 5/1966 | Rhodes et al. | 200/83 M |
| 4,206,780 | 6/1980 | Manecke et al. | 200/83 WM X |
| 4,263,489 | 4/1981 | Bergeson | 200/81 R |
| 4,617,432 | 10/1986 | Hanssen et al. | 403/407.1 X |

*Primary Examiner*—P. W. Echols

*Assistant Examiner*—Irene Cuda

*Attorney, Agent, or Firm*—Candor, Candor & Tassone

[57] ABSTRACT

A method of making a water level control device comprising the steps of forming a frame to have a substantially flat frame plate with opposite sides and with an elongated slot passing therethrough and having a first portion, forming a movable cam follower to be carried by the frame for setting the desired water levels to be provided by the device, forming a slide cam member to have a projection extending through the slot to guide sliding movement thereof relative to the frame, forming the projection means to have an interlocking unit interlocking with the frame while the projection is disposed in the first portion of the slot, forming the cam member to have a cam surface engaging the cam follower to set the same in desired water level setting positions thereof when the projection is in the first portion of the slot, forming the slot to have a second portion thereof for unlocking with the interlocking unit when the projection of the cam member is disposed in the second portion whereby the cam member can be easily detached from or attached to the frame, and forming the interlocking unit of the cam member to bear against one of the sides of the frame plate when the projection is in the first portion of the slot by providing the cam member with a plurality of spaced apart abutments extending outwardly therefrom and bearing against the other of the sides of the frame plate when the projection is in the first portion of the slot so that the projection of the cam member is under tension when the projection is in the first portion of the slot whereby the interlocking unit and the abutments compress the frame plate therebetween and thereby provide resistance to sliding movement of said cam member relative to the frame when the projection is in the first portion of the slot.

15 Claims, 4 Drawing Sheets

METHOD OF MAKING A WATER LEVEL CONTROL DEVICE

CROSS REFERENCE TO RELATED APPLICATION

This application is a divisional patent application of its copending parent patent application, Ser. No. 857,636, filed Apr. 29, 1986, now U.S. Pat. No. 4,696,204.

BACKGROUND OF THE INVENTION

1. Field of the Invention

This invention relates to a new water level control device and to a new method of making the same.

2. Prior Art Statement

It is known to provide a water level control device comprising a frame means provided with elongated slot means having a first portion, movable cam follower means carried by the frame means for setting the desired water levels to be provided by the device, and a slide cam member having projection means extending through the slot means to guide sliding movement thereof relative to the frame means, the projection means having interlocking means interlocking with the frame means while the projection means is disposed in the first portion of the slot means, the cam member having cam surface means engaging the cam follower means to set the same in desired water level setting positions thereof when the projection means is in the first portion of the slot means. For example, see the U.S. Pat. No. 4,295,019 to Buckshaw and the U.S. Pat. No. 4,263,489 to Bergeson.

SUMMARY OF THE INVENTION

One feature of this invention is to provide a water level control device having means for readily attaching or detaching a slide cam member to or from the frame means of the device.

In particular, it was found according to the teachings of this invention that the slide cam member and the elongated slot means of a water level control device can be so uniquely constructed and arranged that the cam member can be easily attached to or detached from the frame means of the device when a projection means of the cam member is disposed in a certain portion of the slot means and the cam member will be interlocked to the frame means when that projection means of the cam member is disposed in another portion of the slot means whereby the cam member can be utilized in a conventional manner to provide the desired water level settings of the control device while the projection means of the cam member is disposed in that other portion of the slot means.

Accordingly, one embodiment of this invention comprises a method of making a water level control device comprising the steps of forming a frame means to have a substantially flat frame plate with opposite sides and with elongated slot means passing therethrough and having a first portion, forming a movable cam follower means to be carried by the frame means for setting the desired water levels to be provided by the device, forming a slide cam member to have projection means extending through the slot means to guide sliding movement thereof relative to the frame means, forming the projection means to have interlocking means interlocking with the frame means while the projection means is disposed in the first portion of the slot means, forming the cam member to have cam surface means engaging the cam follower means to set the same in desired water level setting positions thereof when the projection means is in the first portion of the slot means, forming the slot means to have a second portion thereof for unlocking with the interlocking means when the projection means of the cam member is disposed in the second portion whereby the cam member can be easily detached from or attached to the frame means, and forming the interlocking means of the cam member to bear against one of said sides of the frame plate when the projection means is in the first portion of the slot means by providing the cam member with a plurality of spaced apart abutment means extending outwardly therefrom and bearing against the other of the sides of the frame plate when the projection means is in the first portion of the slot means so that the projection means of the cam member if under tension when the projection means is in the first portion of the slot means whereby the interlocking means and the abutment means compress the frame plate therebetween and thereby provide resistance to sliding movement of the cam member relative to the frame means when the projection means is in the first portion of the slot means.

Accordingly, it is an object of this invention to provide a new method of making a water level control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
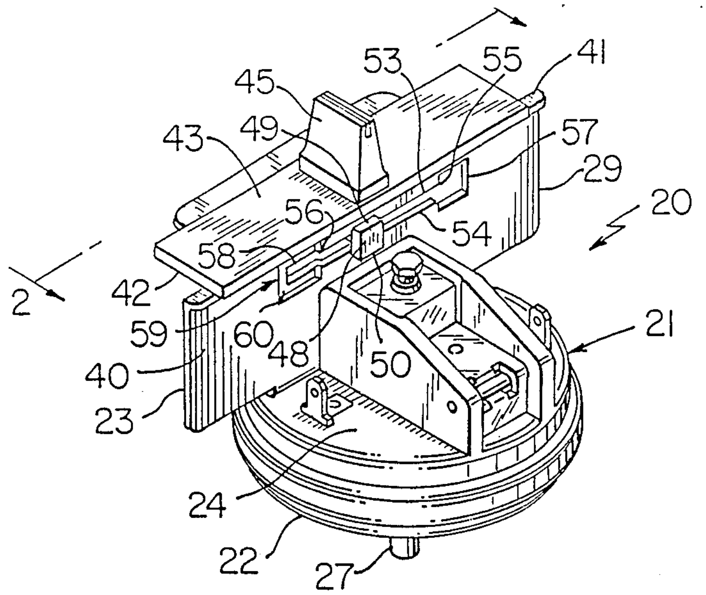
FIG. 1 is a top perspective view of the new water level control device of this invention, the slide cam member of the device in FIG. 1 being set in one of the water level setting positions thereof.

While the various features of this invention are hereinafter described and illustrated as being particularly adapted to provide a water level control device for a laundry machine, it is to be understood that the various features of this invention can be utilized singly or in any combination thereof to provide a pressure responsive control device for other purposes and apparatus as desired.

Therefore, this invention is not to be limited to only the embodiment illustrated in the drawings, because the drawings are merely utilized to illustrate one of the wide variety of uses of this invention.

Figure 2:
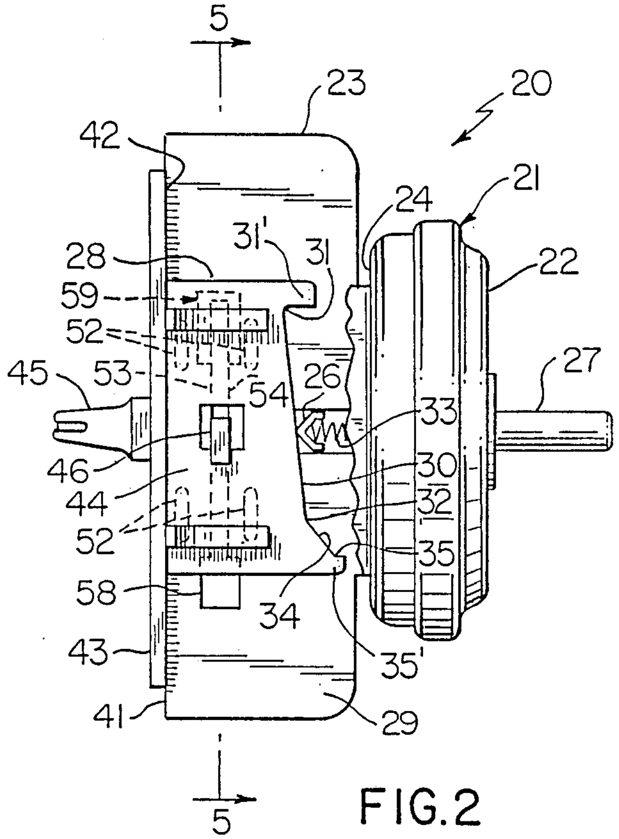
FIG. 2 is an enlarged, partially broken away, rear view of the water level control device of FIG. 1 and is taken in the direction of the arrows 2—2 of FIG. 1.
Figure 3:
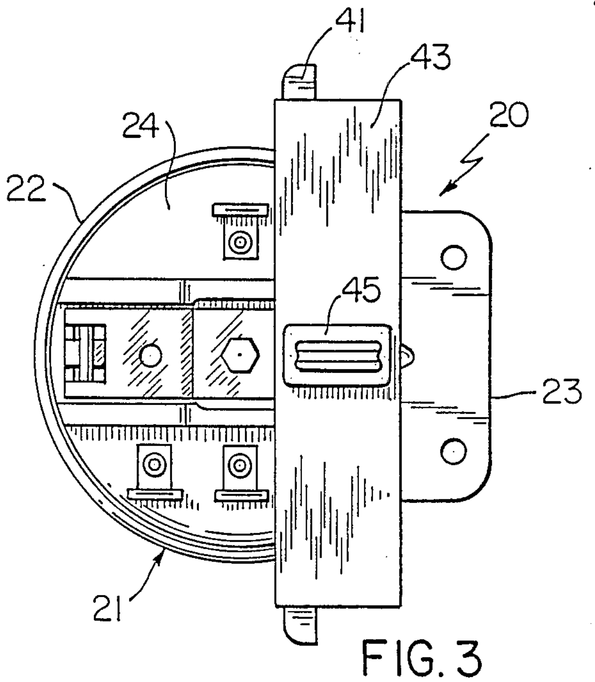
FIG. 3 is an enlarged top view of the water level control device of FIG. 1.
Figure 6:
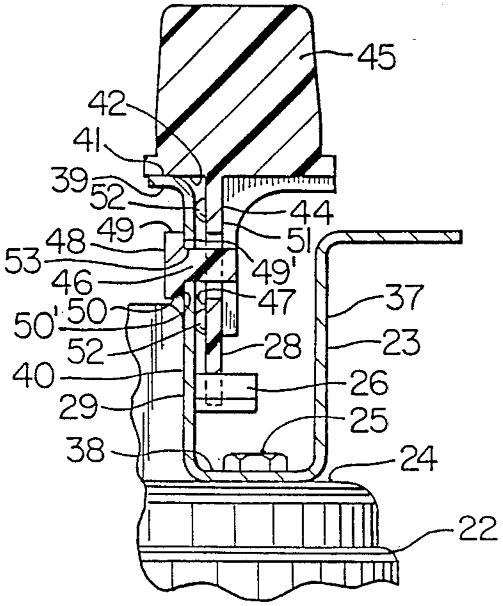
FIG. 6 is a fragmentary cross-sectional view taken on line 6—6 of FIG. 5.
Figure 7:
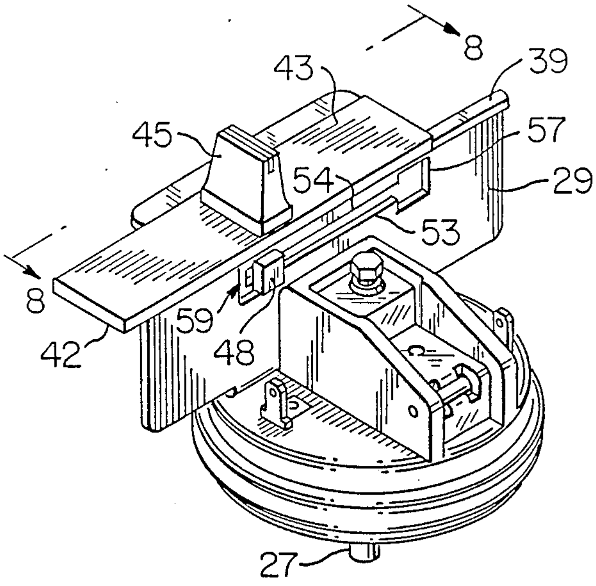
FIG. 7 is a view similar to FIG. 1 and illustrates the water level control device with the cam member thereof set in a resetting position thereof.

Referring now to FIGS. 1-3, the new water level control device of this invention is generally indicated by the reference numeral 20 and comprises a frame means that is generally indicated by the reference numeral 21, the frame means 21 including a housing 22 and a generally U-shaped bracket 23 formed of any suitable material such as metallic material, and being secured to a top surface 24 of the housing 22 in a conventional manner such as by the fastening members 25 illustrated in FIG. 6.

The housing 22 has a movable cam follower 26 to be set in various positions thereof that will be apparent hereinafter to control the level of water being directed into a laundry chamber (not shown) of a laundry apparatus (not shown) in a manner well known in the art.

For example, see the aforementioned U.S. Pat. Nos. 4,295,019 and 4,263,489, as well as U.S. Pat. Nos. 3,249,712 and 3,359,387, for the details of the structure and operation of water level control devices that control the water filling operations of laundry machines or the like and such four U.S. patents are being incorporated into this disclosure by this reference thereto. In fact, the water level control device 20 of this invention is of substantially the same type as set forth in the above mentioned U.S. Pat. Nos. 4,295,019 and 3,249,712 wherein the cam follower of such patents corresponds to the cam follower 26 illustrated in the Figures of this application.

Thus, it can be seen that the air pressure created by the filling of the laundry chamber with water is adapted to be directed to the water level control device 20 by a flexible conduit (not shown) interconnected to a nipple 27 of the housing 22 to pressurize a chamber therein that has a flexible diaphragm adapted to act on an electrical switch within the housing 22 that causes a termination of the water filling operation when the level thereof reaches the level that has been selected by the cam follower 26.

The means for setting the cam follower 26 of the water level control device 26 of this invention comprises a movable cam member 28 that is a one-piece homogeneous member formed of any suitable material, such as plastic material as illustrated, and is adapted to slide relative to a substantially flat frame plate 29 of the bracket 23 of the frame means 21 in a manner hereinafter set forth so that a cam surface 30 thereof can act on the cam follower 26 to set the same in any desired setting position thereof between a minimum low water level setting when a portion 31 of the cam surface 30 is disposed against the cam follower 26 and a maximum high water level setting when a portion 32 of the cam surface 30 is disposed against the cam follower 26 as is well known in the art, the cam follower 26 being urged against the cam surface 30 by a compression spring 33 as is also well known in the art.

Thus, it can be seen that the cam surface 30 is infinitely variable between the low setting portion 31 thereof and the high setting portion 32 thereof as the slide member 28 is moved relative to the frame means 21.

Also, as is well known in the water level control art, once a water level setting has been selected by the cam member 28 and the level of the water filling the laundry chamber has reached such level to cause the electrical switch means of the control device 20 to terminate the operation of the water filling operation, the cam member 28 cannot thereafter be set to a higher water level setting to cause the further filling of the laundry chamber with water unless the electrical switch means of the water level control device 20 is reset by moving the cam follower 26 downwardly toward the housing means 22 to a resetting position thereof for the reasons fully set forth in the aforementioned U.S. patents.

Accordingly, the cam surface 30 of the slide cam member 28 is provided with a steep reset portion 34 adjacent the higher water level setting portion 32 thereof so that as the slide cam member 28 is moved from the portion 32 thereof engaging the cam follower 26 so as to have the end 35 of the steep portion 34 engage the same, the cam follower 26 has been moved to its reset position. In this manner, the electrical switch means in the water level control device 20 is reset so that the operator can now utilize the slide member 28 to select a higher water level setting than the original setting thereof so that additional water can be added to the laundry chamber than was added during the initial level selection thereof as is well known in the art.

In order to prevent the cam surface 30 of the cam member 28 from moving off of the cam follower 26 when the minimum water level portion 31 and the resetting portion 35 thereof is engaging the cam follower 26, the cam surface 30 is provided with stops 31' and 35' which will respectively engage the cam follower 26 to prevent further movement of the cam member 28 in the low water level setting direction thereof and in the resetting direction thereof.

Figure 4:
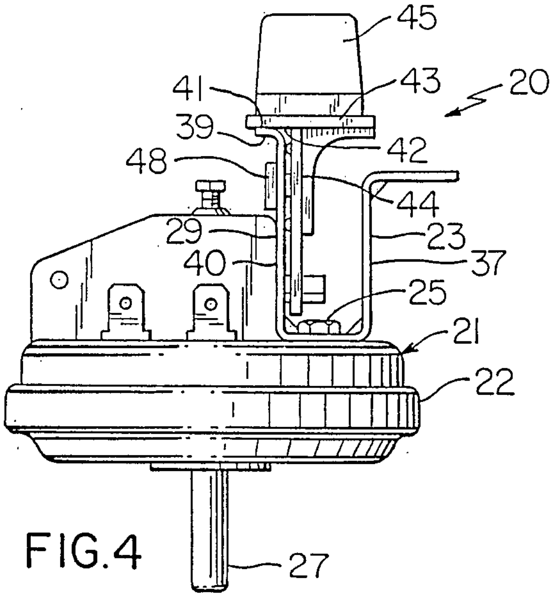
FIG. 4 is an enlarged end view of the water level control device of FIG. 1.
Figure 5:
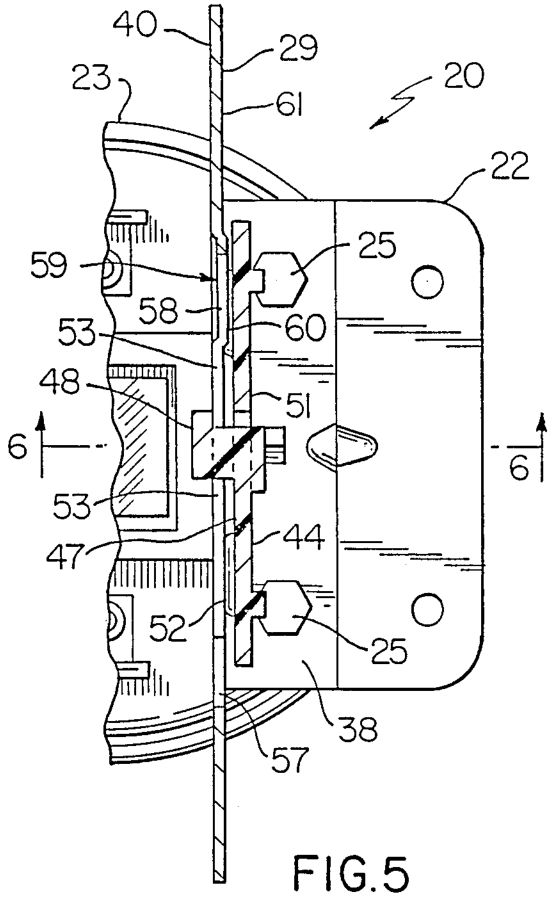
FIG. 5 is an enlarged, fragmentary cross-sectional view taken on line 5—5 of FIG. 2.

The bracket 23 of the water level control device 20 has the flat plate 29 thereof disposed parallel to another flat plate 37, FIGS. 4 and 6, which is parallel thereto and spaced therefrom by a flat yoke plate 38 of the U-shaped bracket 23 which is the part thereof that is fastened to the housing 22 by the fastening members 25.

The frame plate 29 has its upper end 39 outwardly turned relative to the side 40 thereof and defines a substantially flat surface means 41 against which a surface 42 of the cam member 28 is adapted to bear in sliding relation as will be apparent hereinafter, the surface 42 being a lower surface of a substantially rectangularly shaped flat plate-like part 43 of the cam member 28 and being disposed substantially transverse to a depending part 44 thereof that has the cam surface 30 on the free end thereof.

The flat part 43 of the cam member 28 includes a handle portion 45 that is adapted to be grasped by the operator who can thereby slide the cam member 28 relative to the frame means 21 for selecting the desired water level setting as will be apparent hereinafter.

The depending part 44 of the cam member 28 has a projection means 46 extending from the side 47 thereof and being integrally interconnected to an interlocking part 48 thereof that has a substantially rectangular or square configuration and defines a pair of edge means 49 and 50 that extend outboard of the projection means 46 for a purpose hereinafter set forth. The projection means 46 also extends beyond the other side 51 of the depending part 44 of the cam member 28 so as to provide reinforcement for the projection means 46 as the projection means is integral with the depending part 44 of the cam member 28.

A plurality of abutments 52 are carried by the depending portion 44 of the cam member 28 and extend outwardly from a side 47 thereof, the abutments 52 being elongated and comprising two spaced apart pairs thereof with each pair having its abutments 52 thereof spaced from each other and being located on opposite sides of the projection means 46 as illustrated in FIG. 2 for a purpose hereinafter described.

While the cam member 28 is illustrated as being one-piece and homogeneous throughout all of the structure thereof previously described, it is to be understood that the cam member 28 can be formed from a plurality of parts and/or materials as desired.

The frame plate 29 of the frame means 21 has an elongated slot means 53 passing completely therethrough, the slot means 53 having a first portion 54 thereof that is substantially uniform throughout the length thereof and has opposite ends 55 and 56 respectively interconnected to a second portion 57 of the slot means 53 and a third portion 58 of the slot means 53. The first portion 54 of the slot means 53 has the same width as the width of the third portion 58 while the second portion 57 is wider than the first portion 54 and is of a size to readily receive the interlocking portion 48 of the cam member 28 therethrough when the cam member 28 is being assembled to the frame means 21 or being disassembled therefrom as hereinafter set forth and as illustrated in FIGS. 11–13.

The side 40 of the frame plate 29 is provided with a substantially rectangular relief area 59 of a width greater than the width of the interlocking part 48 of the cam member 28 for a purpose hereinafter described and having a length greater than the length of the interlocking part 48 as well as a length greater than the length of the third portion 58 of the slot means 53 as illustrated in FIG. 1.

Figure 9:
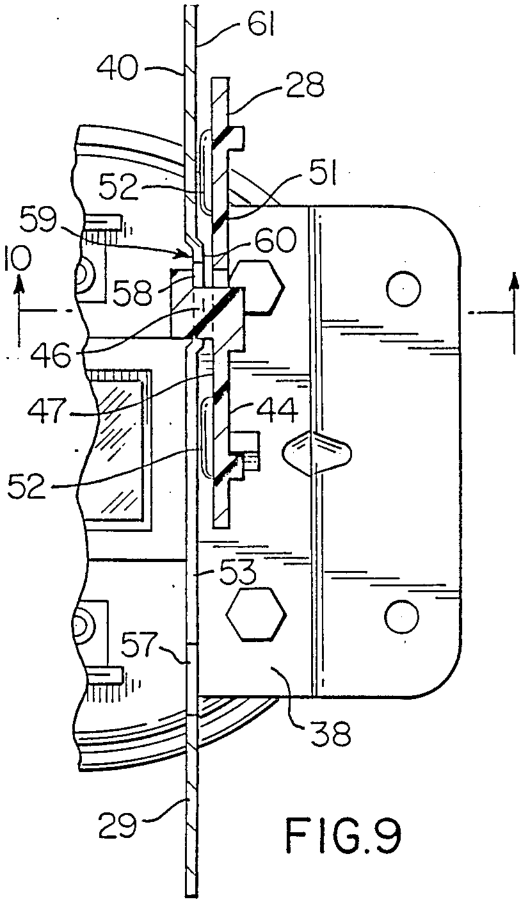
FIG. 9 is an enlarged, fragmentary cross-sectional view taken on line 9—9 of FIG. 8.
Figure 8:
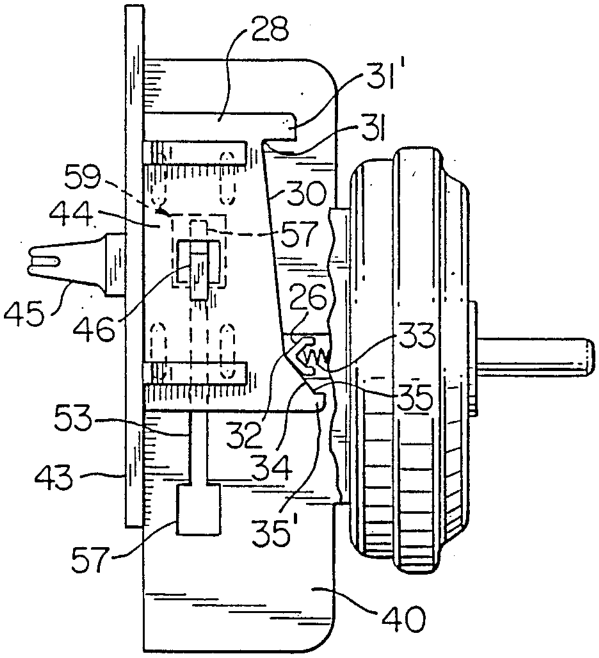
FIG. 8 is an enlarged partially broken away rear view of the water level control device of FIG. 7 and is taken in the direction of the arrow 8—8 of FIG. 7.
Figure 10:
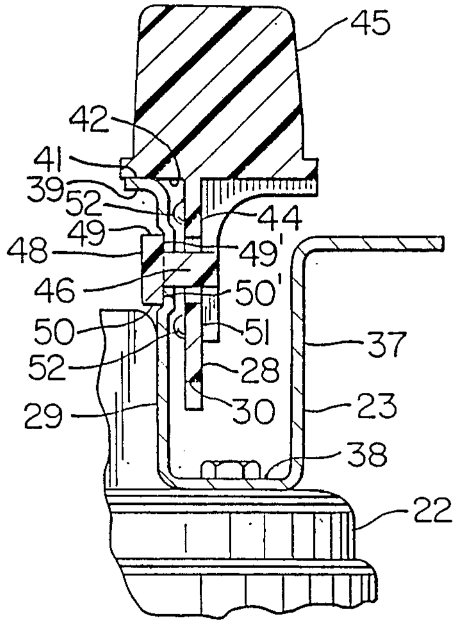
FIG. 10 is a fragmentary cross-sectional view taken on line 10—10 of FIG. 9.

The relief area 59 in the side 40 of the frame plate 29 is formed by embossing or stamping the frame plate 29 so that the relief area 59 causes a section 60 of the frame plate 29 to be offset out of the plane thereof in a direction of the other side 61 thereof as illustrated in FIG. 9.

Figure 11:
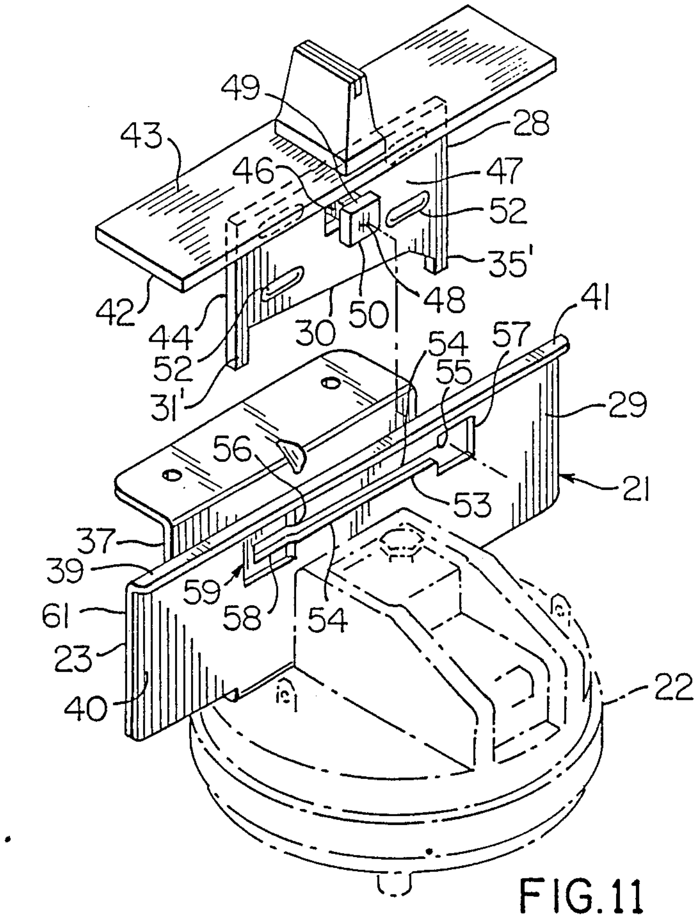
FIG. 11 is an exploded perspective view of the bracket of the frame means of the water level control device of this invention and the slide cam member therefor so as to illustrate how the slide cam member can be attached thereto or detached therefrom, the remaining portion of the water level control device being illustrated by phantom lines.
Figure 13:
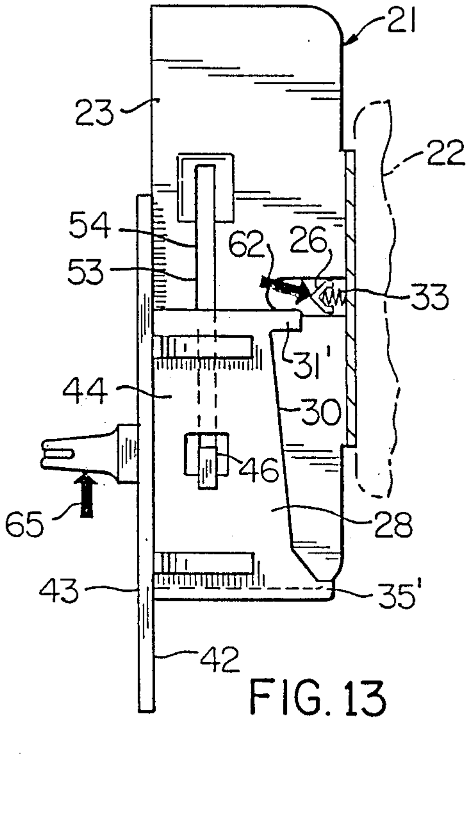
FIG. 13 is a fragmentary cross-sectional view taken on line 13—13 of FIG. 12 and illustrating how the slide cam member is assembled to the bracket of the frame means of the water level control device.
Figure 12:
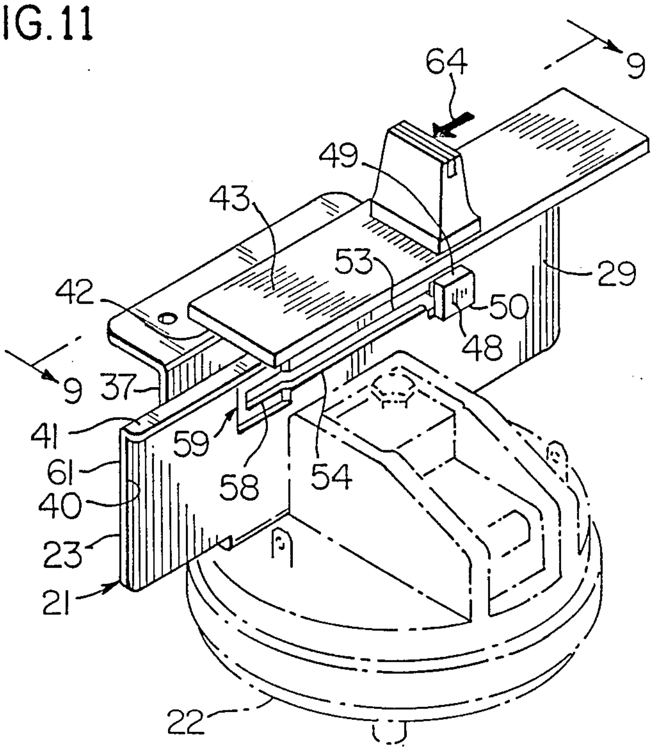
FIG. 12 is a view similar to FIG. 11 and illustrates the slide cam member in one assembled position thereof with the bracket of the frame means of the water level control device of this invention.

When it is desired to assemble a cam member 28 of this invention to the bracket 23 of the frame means 21, whether or not such bracket 23 has been assembled to the housing 22 or not, it can be seen in FIGS. 11–13 that the depending part 44 of the cam member 28 is inserted between the frame plates 29 and 37 and the interlocking means 48 is aligned with the second portion 57 of the slot means 53 so that the interlocking means 48 can be pushed therethrough from the side 61 of the frame plate 29 through to the other side 40 thereof whereby the projection means 46 is fully received within the second portion 57 of the slot means 53. At this time, the surface 42 of the upper part 43 of the cam member 28 is disposed against the surface 41 on the turned over position 39 of the frame plate 29 so that the cam member 28 can be moved in a sliding manner parallel to the plane of the frame plate 29 so as to cause the projection 46 to be received within the first portion 54 of the slot means 53 and have the outer portions 49 and 50 of the interlocking part 48 overlap the side 40 of the frame plate 29 in an interlocking manner adjacent the first portion 54 of the slot means 53.

In order to permit such sliding movement of the cam member 28 from the second portion 57 of the slot means 53 should the bracket 23 be fastened to the housing 22 at the time the cam member 28 is being assembled thereto, the cam follower 26 can be pushed toward the housing means 22 in the manner represented by the arrow 62 in FIG. 13 so that the slide cam member 28 can then be moved in the direction represented by the arrows 64 and 65 in FIGS. 12 and 13 respectively in order to cause the stop 31' of the cam surface 30 to clear beyond the cam follower 26. Once the stop 31' has cleared beyond the cam follower 26, the pressure 62 can be removed from the cam follower 26 so that the force of the compression spring 33 will cause the cam follower 26 to bear against the cam surface 30 between the stops 31' and 35' as illustrated throughout the drawings.

The interlocking portion 48 of the cam member 28 has surfaces 49' and 50' of the overlapping portions 49 and 50 thereof bearing against the side 40 of the frame plate 29 when the projection means 46 is disposed in the first portion 54 of the slot means 53 and the abutments 52 on the side 47 of the depending part 44 of the cam member 28 are so constructed that the same bear against the side 61 of the frame plate 29 and actually cause the frame plate 29 to be compressed between the abutments 52 and the surfaces 49' and 50' of the interlocking part 48 whereby the projection means 46 of the cam member 28 is under tension while the same is disposed in the first portion 54 of the slot means 53. This provides resistance to sliding movement of the cam member 28 while the projection means 46 thereof is in the first portion 54 of the slot means 53. In this manner, the operator has "feel" in sliding the cam member 28 within the first portion 54 of the slot means 53 to position the cam surface 30 at the desired water level setting in cooperation with the cam follower 26 and the cam member 28 will remain in such selected position and will not vibrate out of the same because of the friction being provided by the surfaces 49', 50' and abutments 52 respectively bearing on the surfaces 40 and 61 of the frame plate 29.

However, when the operator slides the cam member 28 so as to cause the reset slope 34 thereof to act on the cam follower 26, the projection means 46 is now brought into the third portion 58 of the slot means 53 whereby the interlocking part 48 is now received in the relief area 59 as illustrated in FIGS. 7–10. In this manner, the tension in the projection means 46 is completely removed so that the abutments 52 and surfaces 49' and 50' do not provide any resistance to sliding movement of the cam member 28 while the projection means 46 is within the third portion 58 of the slot means 53. In this manner, once the cam member 28 has the portion 35 of the cam surface 30 act on the cam follower 26 to reset the electrical switch, the spring 33 is free to readily cause the cam member 28 to slide out of the reset position thereof to the high water level position thereof when the cam follower 26 is acting on the portion 32 of the cam surface if the operator does not immediately move the cam member 28 to a new water level setting position thereof and merely lets go of the cam member 28 with the portion 35 thereof being against its cam follower 26, such feature being provided by an integral spring means of the cam member of the water level control in the aforementioned U.S. Pat. No. 4,295,019. In fact, if desired, such integral spring means of the aforementioned U.S. Pat. No. 4,295,019 can be provided for the cam member 28 of this invention, if desired.

Once the cam follower 26 has been actuated to a resetting position thereof by the cam portion 35 acting thereon, normally the operator then moves the cam member 28 so as to cause the projection means 46 thereof to reenter into the first portion 54 of the slot means 53 so that the cam surface 30 can be adjusted to the desired operating condition for the cam follower 26 as previously set forth. Of course, once the projection means 46 of the cam member 28 has reentered the first portion 54 of the slot means 53, the projection means 46 is again placed under tension by the abutments 52 and surfaces 49' and 50' respectively acting on the surfaces 40 and 61 of the frame plate 29 as previously described.

Should it be desired to remove a cam member 28 from a bracket 23 after the same has been assembled thereto in the manner previously described, the operator merely moves the cam member 28 to cause the projection means 46 to be fully received in the second portion 57 of the slot means 53 whereby the cam member 28 then can be moved outwardly relative to the side 61 thereof and the interlocking means 48 will be readily pulled through the second portion 57 of the cam slot 53 so that the cam member 28 is completely removed therefrom without requiring a destruction of the interlocking means thereof so that the removed cam member 28 can be subsequently reused if desired.

In this manner, cam members 28 with different cam surfaces 30 can be utilized with the same water level control device 20 as the same can be readily assembled with the bracket 23 thereof in the manner previously described so that the same housing means 22 can be utilized with different cam members 28 and for different operating performance thereof and such cam member change can readily be accomplished in the field if desired.

Therefore, it can be seen that this invention not only provides a new water level control device, but also this invention provides a new method of making a water level control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A method of making a water level control device comprising the steps of forming a frame means to have a substantially flat frame plate with opposite sides and with elongated slot means passing therethrough and having a first portion, forming a movable cam follower means to be carried by said frame means for setting the desired water levels to be provided by said device, forming a slide cam member to have projection means extending through said slot means to guide sliding movement thereof relative to said frame means, forming said projection means to have interlocking means interlocking with said frame means while said projection means is disposed in said first portion of said slot means, and forming said cam member to have cam surface means engaging said cam follower means to set the same in desired water level setting positions thereof when said projection means is in said first portion of said slot means, the improvement comprising the steps of forming said slot means to have a second portion thereof for unlocking with said interlocking means when said projection means of said cam member is disposed in said second portion whereby said cam member can be easily detached from or attached to said frame means and forming said interlocking means of said cam member to bear against one of said sides of said frame plate when said projection means is in said first portion of said slot means by providing said cam member with a plurality of spaced apart abutment means extending outwardly therefrom and bearing against the other of said sides of said frame plate when said projection means is in said first portion of said slot means so that said projection means of said cam member is under tension when said projection means is in said first portion of said slot means whereby said interlocking means and said abutment means compress said frame plate therebetween and thereby provide resistance to sliding movement of said cam member relative to said frame means when said projection means is in said first portion of said slot means.

2. A method of making a water level control device as set forth in claim 1 and including the steps of forming said frame plate to have an outwardly turned edge means, and forming said cam member to have a surface means engaging said edge means to be guided thereby during sliding movement of said cam member relative to said frame means.

3. A method of making a water level control device as set forth in claim 1 and including the step of forming said projection means and said interlocking means to be one-piece and homogeneous with said cam member.

4. A method of making a water level control device as set forth in claim 1 and including the steps of forming said interlocking means of said cam member to have two spaced apart surface areas respectively engaging said one side of said frame plate at areas thereon that are separated from each other by said first portion of said slot means.

5. A method of making a water level control device as set forth in claim 4 and including the step of forming said abutment means to have two spaced apart surface areas respectively engaging said other side of said frame plate at areas thereon that are separated from each other by said slot means.

6. A method of making a water level control device as set forth in claim 4 and including the step of forming said abutment means to have two pairs of spaced apart surface areas with each pair respectively engaging said other side of said frame plate at areas thereon that are separated from each other by said slot means.

7. A method of making a water level control device as set forth in claim 6 and including the step of forming said surface areas of said interlocking means to be disposed intermediate said two pairs of surface areas of said abutment means.

8. A method of making a water level control device as set forth in claim 1 and including the steps of forming said cam surface means to have a reset area thereon for resetting said control device when said reset area is engaging said cam follower means, forming said slot means to have a third portion thereof for receiving said projection means of said cam member therein, and forming said reset area of said cam member to engage said cam follower means only when said projection means of said cam member is disposed in said third portion of said slot means.

9. A method of making a water level control device as set forth in claim 8 and including the step of forming said frame means has means to cooperate with said interlocking means to relieve the tension in said projection means when said projection means is disposed in said third portion of said slot means.

10. A method of making a water level control device as set forth in claim 9 and including the step of forming said means cooperating with said interlocking means to comprise a depressed area in said frame plate adjacent said third portion of said slot means for receiving said interlocking means therein when said projection means is in said third portion of said slot means whereby said frame plate is not compressed between said interlocking means and said abutment means when said projection means is disposed in said third portion of said slot means.

11. A method of making a water level control device as set forth in claim 1 and including the step of forming said second portion of said slot means to be wider than said first portion of said slot means.

12. A method of making a water level control device as set forth in claim 11 and including the steps of forming said interlocking means to have surface means engaging said frame means adjacent said first portion of said slot means when said projection means of said cam member is disposed in said first portion of said slot means, and forming said surface means of said interlocking means to be out of engagement with said frame means when said projection means of said cam member is disposed in a certain position in said second portion of said slot means whereby said interlocking means can pass through said second portion of said slot means when said projection means is disposed in said certain position in said second portion of said slot means.

13. A method of making a water level control device as set forth in claim 12 and including the step of forming said surface means of said interlocking means of said cam member to comprise two spaced apart areas respectively engaging said frame means at areas thereon that are separated from each other by said first portion of said slot means.

14. A method of making a water level control device as set forth in claim 13 and including the step of forming said projection means and said interlocking means to be one-piece and homogeneous with said cam member.

15. A method of making a water level control device as set forth in claim 14 and including the step of forming said cam member to be a one-piece member formed of plastic material.

* * * * *